US010061852B1

(12) United States Patent
Plenderleith

(10) Patent No.: US 10,061,852 B1
(45) Date of Patent: Aug. 28, 2018

(54) TRANSPARENT PROXY TUNNEL CACHING FOR DATABASE ACCESS

(71) Applicant: Amazon Technologies, Inc., Seattle, WA (US)

(72) Inventor: Jamie Plenderleith, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/716,690

(22) Filed: May 19, 2015

(51) Int. Cl.
G06F 21/72 (2013.01)
G06F 17/30 (2006.01)
H04L 29/08 (2006.01)
G06F 21/60 (2013.01)
G06F 21/10 (2013.01)

(52) U.S. Cl.
CPC .. G06F 17/30864 (2013.01); G06F 17/30153 (2013.01); G06F 21/602 (2013.01); H04L 67/2842 (2013.01)

(58) Field of Classification Search
CPC ............... G06F 21/602; G06F 21/6245; H04L 63/0428; H04L 2463/062; H04L 63/045; H04L 63/062
USPC ............ 713/165, 189; 707/683, 769; 726/22
See application file for complete search history.

(56) References Cited

U.S. PATENT DOCUMENTS 6,519,592 B1   2/2003  Getchius et al.
6,564,218 B1*  5/2003  Roth ................. G06F 17/30902
7,624,126 B2* 11/2009  Pizzo ................ G06F 17/30902
7,636,740 B2  12/2009  Lee et al.
7,788,449 B2   8/2010  Karn et al.
7,945,577 B2   5/2011  Altinel et al.
7,984,073 B1*  7/2011  Basiago ............ G06F 17/30312
                                                            707/802
8,108,375 B2*  1/2012  Barsness ............ G06F 17/3046
                                                            707/705
8,543,554 B1*  9/2013  Singh ................. G06F 17/3048
                                                            370/389
2003/0237081 A1* 12/2003 Taylor ...................... G06F 8/65
                                                            717/168
2004/0030758 A1*  2/2004 Cherdron ............ G06F 17/3089
                                                            709/218

(Continued)

OTHER PUBLICATIONS

Brad Fitzpatrick, "Distributed Caching with Memcached", Linux Journal, Aug. 2004, pp. 1-7, vol. 2004, Issue 124.

Primary Examiner — Gary S Gracia
(74) Attorney, Agent, or Firm — Robert C. Kowert; Meyertons, Hood, Kivlin, Kowert & Goetzel, P.C.

(57) ABSTRACT

A proxy tunnel may be implemented to provide transparent caching for database access. A database proxy may maintain a results cache of previous queries directed to a database. Database clients may send access requests directed to a database, such as query requests or update requests, to a database proxy formatted according to an interface for the database. When a query request is received, the query request may be evaluated to determine whether the results cache maintains a valid version of the data requested by the query. If valid, the results cache may be accessed and the data sent to the client without querying the database for the data. Multiple database proxies may be implemented to provide compression and encryption when transporting data between a database client and a database, in some embodiments.

20 Claims, 11 Drawing Sheets

(56) References Cited

U.S. PATENT DOCUMENTS

| | | | |
|---|---|---|---|
| 2004/0092261 A1* | 5/2004 | Kiiskinen | H04W 8/18 455/435.1 |
| 2005/0138176 A1* | 6/2005 | Singh | G06F 17/30902 709/226 |
| 2006/0212524 A1* | 9/2006 | Wu | H04L 67/1095 709/206 |
| 2007/0198267 A1* | 8/2007 | Jones | G06F 17/30637 704/257 |
| 2008/0098173 A1* | 4/2008 | Chidambaran | G06F 17/3048 711/118 |
| 2009/0144258 A1* | 6/2009 | Taylor | G06F 17/30442 |
| 2010/0106459 A1* | 4/2010 | Bakalov | H04L 41/042 702/182 |
| 2010/0174939 A1* | 7/2010 | Vexler | G06F 17/3048 714/5.1 |
| 2010/0312784 A1 | 12/2010 | Boyd et al. | |
| 2012/0173517 A1* | 7/2012 | Lang | G06F 17/30498 707/722 |
| 2012/0290727 A1* | 11/2012 | Tivig | H04L 47/193 709/227 |
| 2013/0036157 A1* | 2/2013 | Toupin | G06F 17/30896 709/203 |
| 2013/0117256 A1* | 5/2013 | Gu | G06F 17/30424 707/718 |
| 2013/0151648 A1* | 6/2013 | Luna | H04W 28/02 709/213 |
| 2013/0198231 A1 | 8/2013 | Skidanov et al. | |
| 2013/0346472 A1* | 12/2013 | Wheeldon | H04L 67/2814 709/203 |
| 2014/0108868 A1* | 4/2014 | Neerincx | G06F 11/0709 714/39 |
| 2014/0279929 A1* | 9/2014 | Gupta | G06F 11/1471 707/683 |
| 2014/0281512 A1* | 9/2014 | Arasu | G06F 21/602 713/165 |
| 2014/0304294 A1* | 10/2014 | Sharma | G06F 17/30457 707/769 |
| 2014/0310232 A1* | 10/2014 | Plattner | G06F 17/3048 707/602 |
| 2014/0317084 A1* | 10/2014 | Chaudhry | G06F 17/30457 707/713 |

* cited by examiner

TRANSPARENT PROXY TUNNEL CACHING FOR DATABASE ACCESS

BACKGROUND

Database systems are ubiquitous, providing storage and access to data for countless database clients. These database clients provide many different services and functionalities in many different applications. The performance of database systems, therefore, directly affects the performance of these different applications. Typically, a database client connects directly to a database, issues queries and other requests, receives requested data, and performs various actions based on the data. Some data is accessed more frequently than others. For instance, item detail data for a web page may be stored in a database and frequently accessed when the web page for the item is viewed. When the same data is frequently accessed and returned, it may be more efficient to keep a copy of the data in a more accessible location, such as a cache. By caching frequently queried data, the cache may be used to service requests without having to access the database maintaining the data.

Figure 1:
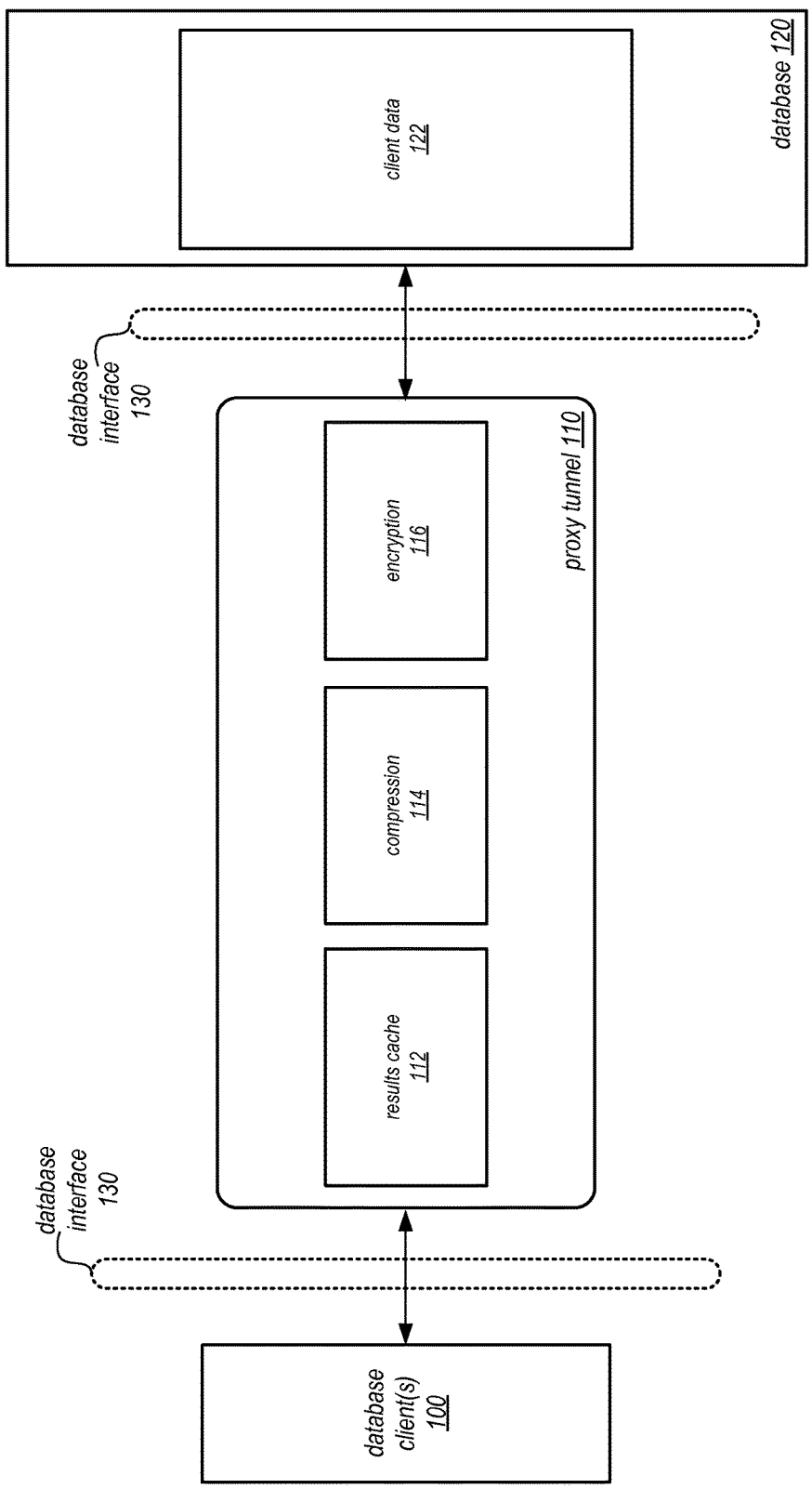
FIG. 1 is a block diagram illustrating transparent proxy tunnel caching for database access, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits and/or program instructions that when executed by the hardware circuits causes the hardware circuits to perform the task or tasks.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of transparent proxy tunnel caching for database access are disclosed. Database caching techniques improve the performance of database systems by storing the results from different requests or queries for particular data in a cache. The cache can be accessed later in order to access the results for another request for the same data—instead of accessing the database. Cache access times are typically much shorter than the time it takes to query a database, process the query at the database, and return the result. Ordinarily, caching techniques are implemented within a database client, as part of the application code or managed by the database client. Such arrangements increase the burden and complexity of database clients to manage both interactions with the database and the cache. Moreover, while some database systems may incorporate caching techniques, database clients maintain little control over the performance of such caching techniques, nor do all database systems implement caching. Transparent proxy tunnel caching for database access provides a results cache to improve database performance without requiring a database client or database system to devote resources to management or implementation of a cache.

FIG. 1 is a block diagram illustrating transparent proxy tunnel caching for database access, according to some embodiments. Database 120 may store client data 122 for database client(s) 100. Database 120 may be any data store accessible to a client and may include, but are not limited to, various kinds of relational database systems, non-relational database systems, key-value stores, or object stores. Database client(s) 100 may be any system or devices configured to communicate with database 120, such as web or application server, mobile computing device, or any other computing device, such as computing system 2000 described below with regard to FIG. 11. Database client(s) 100 may send communications to database 120 via database interface 130, which may be a programmatic interface (e.g., an Application Programming Interface (API)).

A proxy tunnel 110 may be implemented by one or more multiple database proxies, as discussed below with regards to FIGS. 2-4, in order to provide a results cache, such as results cache 112, and other performance improvements for database interactions, such as compression 114 and encryption 116, independent of database client(s) 100 or database 120. For instance, proxy tunnel 110 may provide interactions between database client(s) 100 and database 120 according to the same database interface 130. In this way, the database client 100 and database 120 may be behave as if communications were directly passed between database client(s) 100 and database 120, providing transparent access to database 120 for database client(s) 100. Proxy tunnel 110 may receive access requests from database client(s) 100 formatted according to database interface 130 and process the access requests. For query requests, an evaluation of the query request may be performed to determine if results cache 112 stores the requested data (as a result of a previous query request for the data). If so, then proxy tunnel 110 may return the requested results to database client(s) 100 without accessing database 120. Results cache 112 may store cache results separately from database client(s) 100 or database 120, in various embodiments. For instance, one or more database proxies may implement proxy tunnel 110, and cached results may be stored at one (or more) of the database proxies. If, however, the data is not stored in results cache 112, then proxy tunnel may query database 120 to obtain the desired data. The results cache 112 may then be updated with the obtained data so that a future request for the data may be serviced without accessing database 120. The obtained data may also be returned to database client(s) 100. In this way, traffic between database client(s) 100 and database 120 may be reduced, along with the processing resources consumed at database 120 to handle query requests.

Proxy tunnel 110 may also provide additional optimizations to communications between database 120 and database client(s) 110. For instance, compression techniques may be applied to data transferred via the proxy tunnel so that less communication bandwidth (e.g., network bandwidth) is utilized. Encryption 116 may be provided to increase data security. For instance, communications between database client(s) 100 and database 120 may occur over a public network, such as the Internet. Proxy tunnel 110 may perform encryption/decryption of data so that database client(s) 100 may securely access data.

Please note that the examples described above with regard to FIG. 1 are logical illustrations and are not intended to be limiting as to the type, arrangement, implementation or functionality of database client, proxy tunnel, or database. Different numbers of configurations of systems or devices may be utilized to implement these logical illustrations.

The specification next describes examples of a proxy tunnels configured to provide transparent proxy caching for database access. Included in the description are various aspects of the example proxy tunnels, including database proxies, database clients, networks, and databases. The specification then describes flowcharts of various embodiments of methods for transparent proxy tunnel caching for database access. Next, the specification describes an example system that may implement the disclosed techniques. Various examples are provided throughout the specification.

Figure 2:
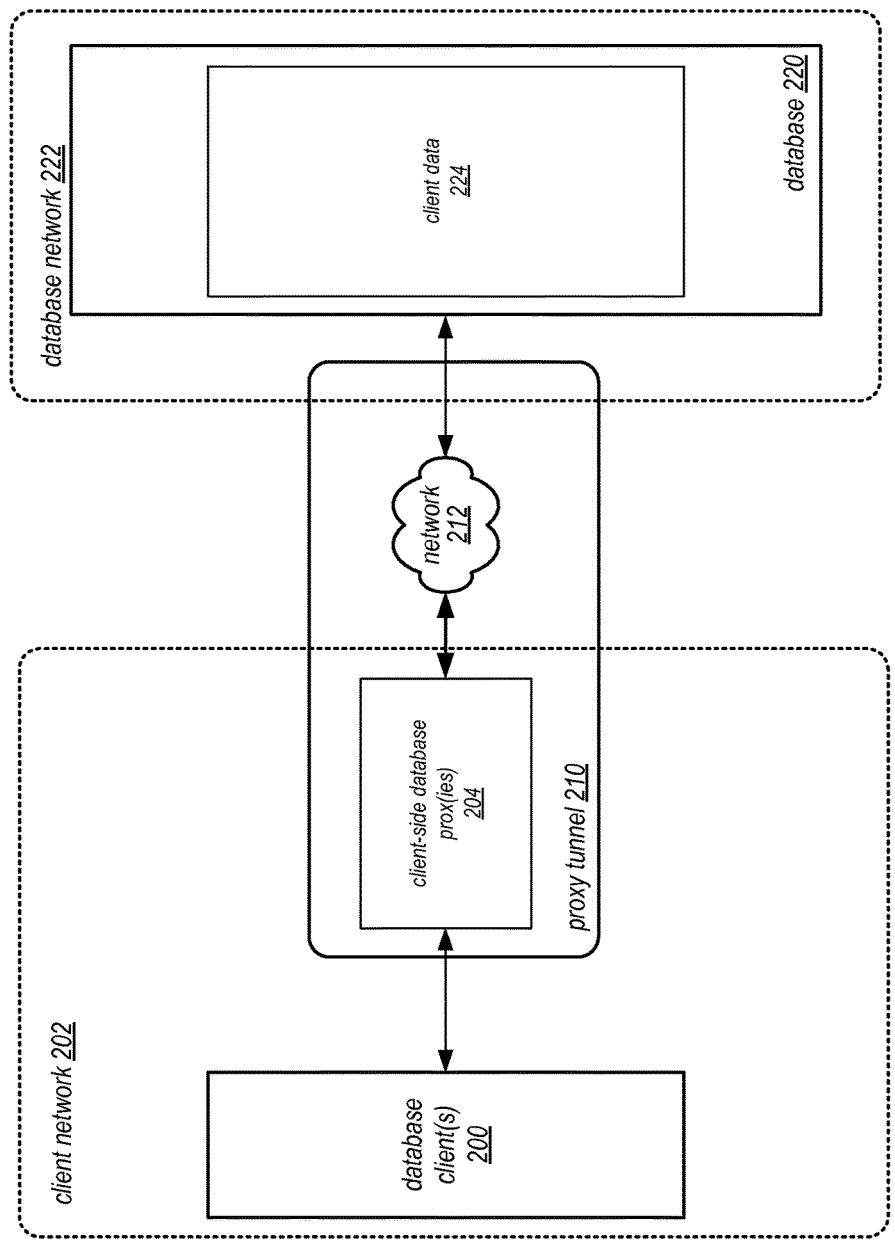
FIG. 2 is a block diagram illustrating a client-side database proxy implementing transparent proxy tunnel caching for database access, according to some embodiments.

FIG. 2 is a block diagram illustrating a client-side database proxy implementing transparent proxy tunnel caching for database access, according to some embodiments. In the illustrated embodiment, one or more multiple clients (shown as database client(s) 200) may be configured to interact with database 220 via proxy tunnel 210. It is noted that where one or more instances of a given component may exist, reference to that component herein may be made in either the singular or the plural. However, usage of either form is not intended to preclude the other.

Database client(s) 200 may encompass any type of client configurable to submit requests to database 220 via network 212, including requests for database services (e.g., a request to generate a snapshot, etc.). For example, a given database client 200 may include a suitable version of a web server, application server, or other system dependent upon a database to operate. Alternatively, a database client 200 (e.g., a database service client of a database service) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, database client 200 may be an application configured to interact directly with database 220. In some embodiments, database client 200 may be configured to generate network-based services requests according to a Representational State Transfer (REST)-style network-based services architecture, a document- or message-based network-based services architecture, or another suitable network-based services architecture.

In some embodiments, a database client 200 (e.g., a database service client) may be configured to provide access to storage of databases to other applications in a manner that is transparent to those applications. For example, database client 200 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to database 220 may be coordinated by database client 200 and the operating system or file system on behalf of applications executing within the operating system environment.

Database client(s) 200 may direct database interactions, communications, or requests to proxy tunnel 210, which may in turn communicate those requests to database 220, if necessary. For instance, the identifier, location, or network address of a database in database client(s) 200 may be set to an identifier, location, or network address (e.g., modifying CNAMES) of client-side database proxy 204 so that requests directed to database 220 are received at client-side database proxy 204. Client-side database proxy 204 may be a database proxy as discussed below with regard to FIG. 5. Client-side database proxy 204 may evaluate requests, such as query requests and update requests, service requests based on stored results in a results cache, and may communicate with database 220 via network 212, as discussed below according to FIGS. 8 and 9. In at least some embodiments, client-side database proxy may be implemented on a separate system or device from database client(s) 200 within client network 202. Client network 202 may be a private and/or secure network, in some embodiments, so that communications between database client(s) 200 may be secure. For example, client-side database proxy may be installed or configured on one or more servers within client network 202. Alternatively, in some embodiments, client-side database proxy 204 may be implemented on a same server, node, system, or devices as database client(s) 200 or client-side database proxy 204 may be implemented at a system located within a different network than client network 202.

Client-side database proxy 204 may convey query requests, update requests, or other database access requests to and receive responses from database 220 via network 212. In various embodiments, network 212 may encompass any suitable combination of networking hardware and protocols necessary to establish network-based-based communications between client-side database proxy 204 and database 220 (or various devices within database network 222 which includes database 220). For example, network 212 may generally encompass the various telecommunications networks and service providers that collectively implement the Internet. Network 212 may also include private networks such as local area networks (LANs) or wide area networks (WANs) as well as public or private wireless networks. For example, network 212 may include the hardware (e.g., modems, routers, switches, load balancers, proxy servers, etc.) and software (e.g., protocol stacks, accounting software, firewall/security software, etc.) necessary to establish a networking link between given client-side database proxy 204 and the Internet as well as between the Internet and database 220.

As discussed above, database 220 may be any type or format of data store which may be accessible to database client(s), such as various kinds of relational database systems, non-relational database systems, key-value stores, or object stores. Database 220 may be implemented within a separate network, database network 222, which may be a private and/or secure network, in some embodiments, so that communications between various components of database 220 may be secure.

A different configuration of transparent proxy tunnel caching is discussed below. FIG. 3 is a block diagram illustrating a server-side database proxy implementing proxy tunnel caching for database access, according to some embodiments. In the illustrated embodiment, one or multiple clients (shown as database client(s) 300) may be configured to interact with database 320 via proxy tunnel 310. It is noted that where one or more instances of a given component may exist, reference to that component herein may be made in either the singular or the plural. However, usage of either form is not intended to preclude the other.

Database client(s) 300 may be like database client(s) 200 discussed above with regard to FIG. 2. Database client(s) 300 may direct database interactions, communications, or requests to proxy tunnel 310, which may in turn communicate those requests to database 320, if necessary. For instance, the identifier, location, or network address of a database in database client(s) 300 may be set to an identifier, location, or network address (e.g., modifying CNAMES) of server-side database proxy 326 so that requests directed to database 320 are received at server-side database proxy 326. Server-side database proxy 326 may be a database proxy as discussed below with regard to FIG. 5. Server-side database proxy 326 may evaluate requests, such as query requests and update requests, service requests based on stored results in a results cache, and may communicate with database 320 via network 312, as discussed below according to FIGS. 8 and 9. Network 312 may be a network similar to network 212 discussed above. Server-side database proxy may be implemented on a separate system or device from database 320 within database network 322. Database network 322 may be a private and/or secure network, in some embodiments, so that communications between server-side database proxy 326 and database 320 may be secure. For example, server-side database proxy 326 may be installed or configured on one or more servers within database network 322 (e.g., as part of another service offered by a provider network that offers database 320 as a service).

Multiple database proxies may be implemented to provide proxy tunnel caching as discussed below. In addition to the caching techniques, discussed below with regard to FIGS. 8 and 9, encryption, compression, dynamic cache updates, and other performance improvements may be implemented using multiple database proxies. FIG. 4 is a block diagram illustrating multiple database proxies implementing transparent proxy tunnel caching for database access, according to some embodiments. In the illustrated embodiment, one or multiple clients (shown as database client(s) 400) may be configured to interact with database 420 via proxy tunnel 410. It is noted that where one or more instances of a given component may exist, reference to that component herein may be made in either the singular or the plural. However, usage of either form is not intended to preclude the other.

Figure 3:
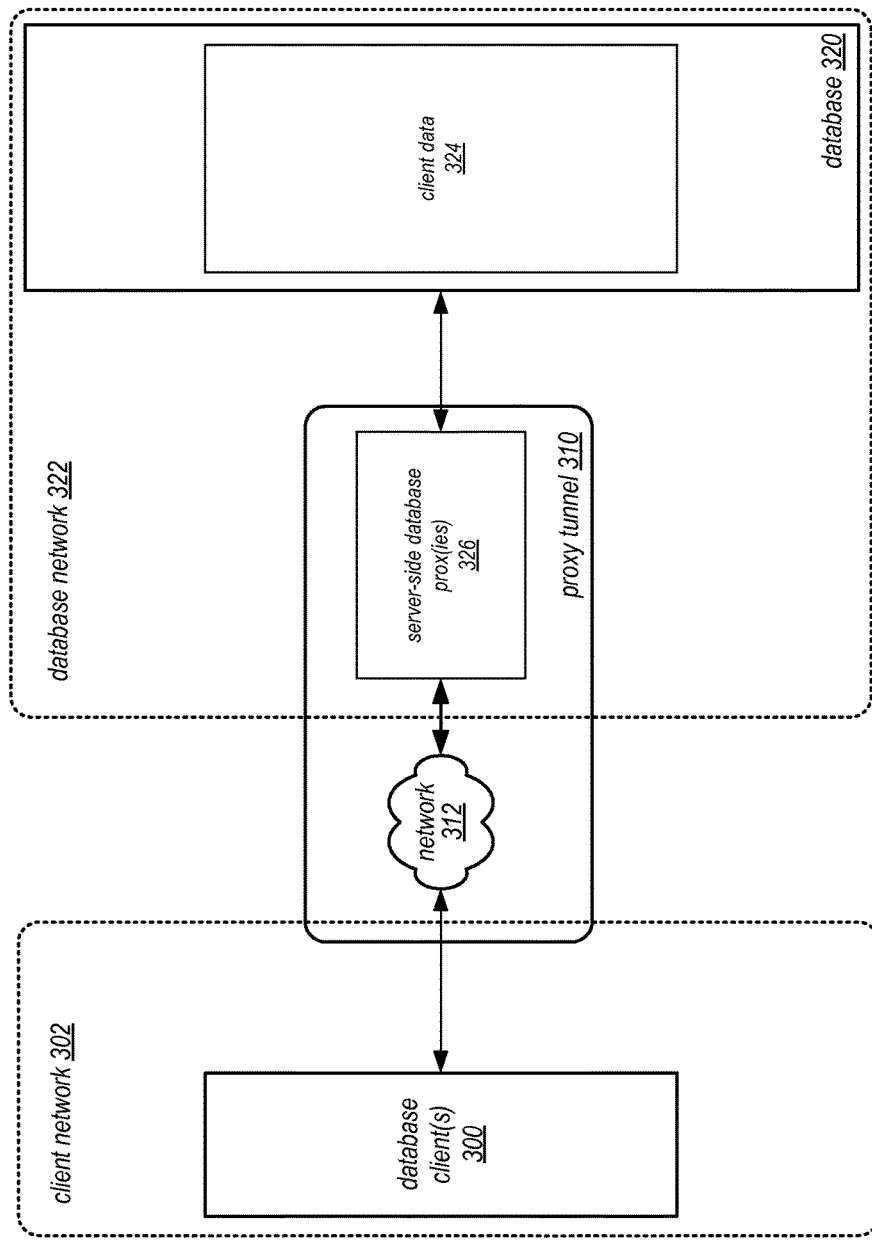
FIG. 3 is a block diagram illustrating a server-side database proxy implementing transparent proxy tunnel caching for database access, according to some embodiments.

As with FIGS. 2 and 3 discussed above, database client(s) 400 may direct database interactions, communications, or requests to proxy tunnel 410, which may in turn communicate those requests to database 420, if necessary. For instance, the identifier, location, or network address of a database in database client(s) 400 may be set to an identifier, location, or network address (e.g., modifying CNAMES) of client-side database proxy 404 so that requests directed to database 420 are received at client-side database proxy 404. In turn client-side database proxy 404 may be configured to communicate with server-side database proxy 426 via network 412, which may be identified similarly using an identifier, location or network address. Network 412 may be a network similar to networks 212 and 312 discussed above, such as a public network like the Internet.

Client-side database proxy 404 and server-side database proxy 426 may be database proxies as discussed below with regard to FIG. 5. Client-side database proxy 404 may evaluate requests, such as query requests and update requests, service requests based on stored results in a results cache, and may communicate with server-side database proxy, if an update is to be performed or requested data is not located in a results cache. Server-side database proxy 426 may perform query requests and updates to database 420 as a result of requests received from client-side database proxy 404 and/or to dynamically update results caches. Communications between client-side database proxy 404 and server-side database proxy 426 may be encrypted and/or compressed in order to provide increased security and efficiency when communicating via network 412. For instance, network 412 may be a public network. Client-side database proxy 404 may be implemented within client network 402, whereas server-side database proxy 426 may be implemented with database network 422. Database networks 404 and 422 may be a private and/or secure networks, and therefore communication between client-side database proxy 404 and server-side database proxy 426 that is encrypted may provide client to database security for data being accessed over network 412.

Figure 4:
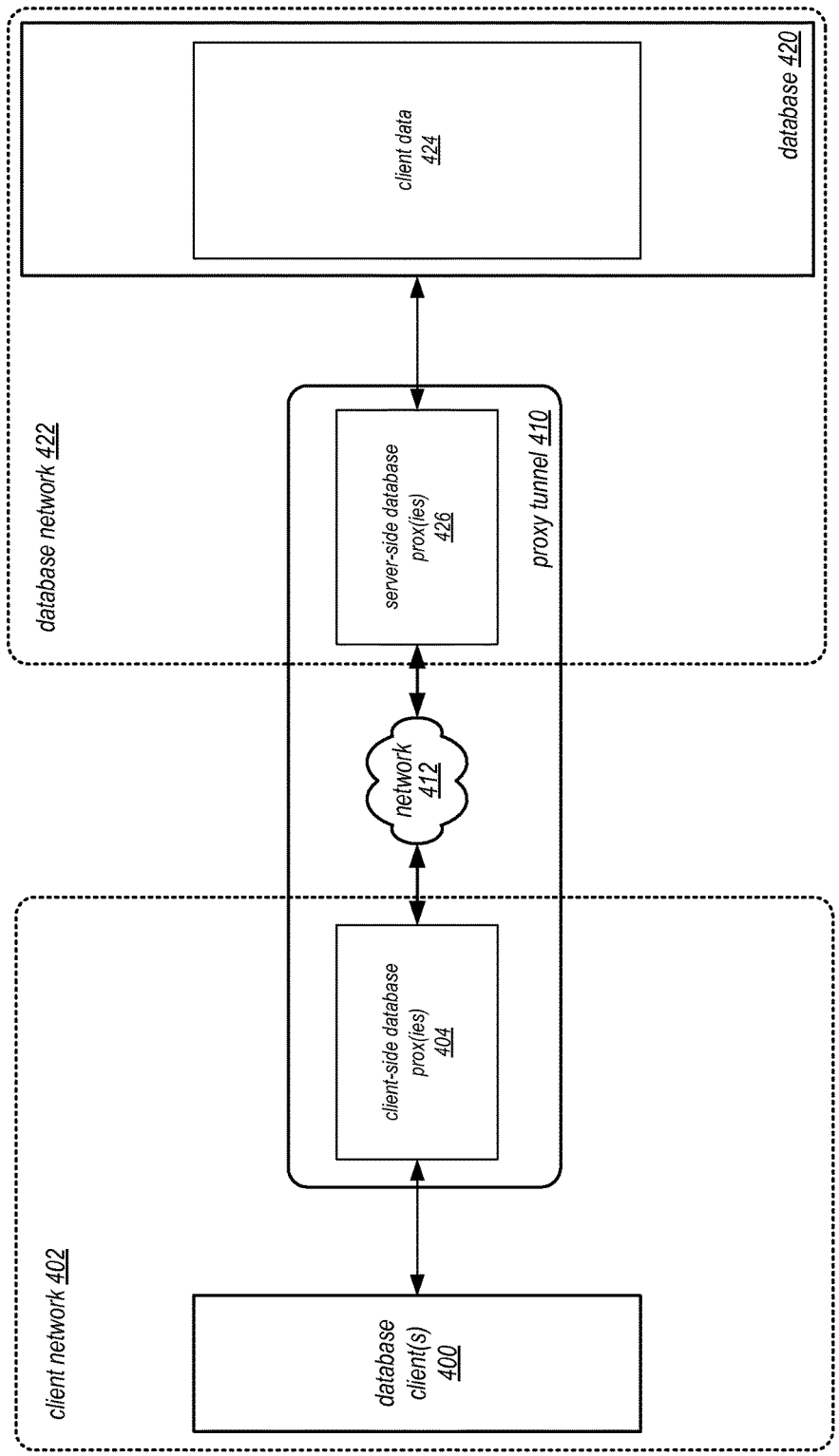
FIG. 4 is a block diagram illustrating is a block diagram illustrating multiple database proxies implementing transparent proxy tunnel caching for database access, according to some embodiments.

In various embodiments, the components illustrated in FIGS. 2-4 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given system component (e.g., a component of the database or a component of the proxy tunnel) may be implemented by a particular node or may be distributed across several nodes. In some embodiments, a given node may implement the functionality of more than one service system component (e.g., more than one database system component).

Figure 5:
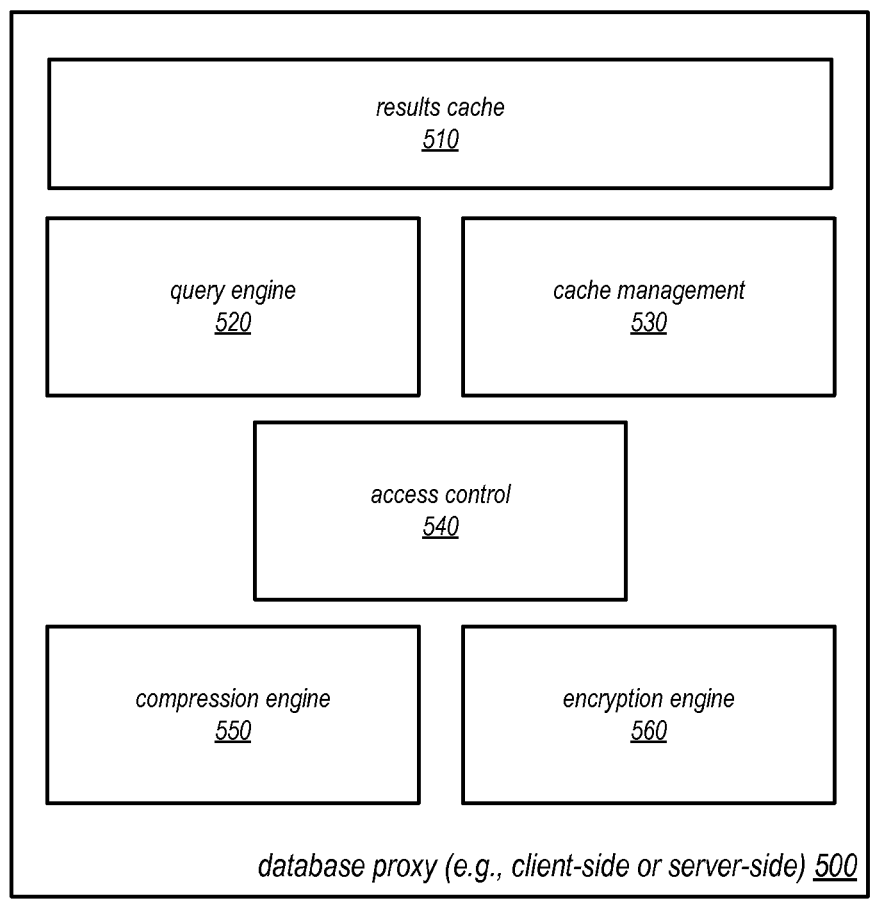
FIG. 5 is a logical block diagram illustrating an example database proxy, according to some embodiments.

FIG. 5 is a logical block diagram illustrating an example database proxy, according to some embodiments. A database proxy may be implemented in hardware and/or software on one or more computers, servers, nodes, and/or computing devices (such as computing system 2000 described below with regard to FIG. 11). Database proxy 500 may simulate or provide the experience of a database system for a database client in a way that is transparent to a database client, in various embodiments. For example, database proxy may implement an interface that replicates the interface of a database, receiving responses from and sending responses to database clients in a same way as the database the requests are directed to. Database proxy 500 may be implemented as a client-side database proxy or server-side database proxy, as discussed above. Results cache 510 may be implemented as part of database proxy 500 in order to provide access to stored results of previously performed query requests without having to query the database.

Database proxy 500 may implement a query engine, such as query engine 520, in order to handle various requests and/or interactions with a database client, in various embodiments. Query engine 520 may be configured to parse communications received from a database client according to a programmatic interface. Structured Query Language (SQL) requests, for instance, may be received from a database client via a JDBC or ODBC interface and for performing SQL statements at the database. Query engine 520 may be configured to parse and/or evaluate the SQL statements in order to perform caching, such as discussed below with regard to FIG. 8. For example, query engine 520 may be implemented to parse a request to determine what entries or other portions of data requested in a query request in order to determine whether the entries or portions of data are stored in results cache 510. Similarly, update requests may be parsed or analyzed by query engine 520 to perform cache invalidations or other operations.

Database proxy 500 may implement results cache 510. Results cache 510 may be an in-memory cache, such as system memory 2020 described below with regard to FIG. 11 or persistent data storage, such as discussed below with regard to persistent storage 2060 in FIG. 11. Results cache 510 may maintain results, such as data, portions of data, or entries, returned in response to previous query requests directed to the database. For instance, a query request for certain records that match particular query predicate condition (e.g., transaction dates less than a week old) may return 10 different database records which may be maintained in results cache 510. In at least some embodiments, results cache 510 may be implemented across multiple database proxies (e.g., multiple client-side database proxies or multiple server-side database proxies). Consider the scenario where different database proxies maintain results for queries to different portions of data maintained in a database. A hash schema, or other distribution scheme, may provide a location heuristic with which the appropriate results cache 510 may be evaluated or access to service a query request. Alternatively, multiple database proxies may maintain copies of the same results cache 510 and publish updates all of the copies any time new results are received or changed at any one copy of results cache 510 at a database proxy 500.

In some embodiments, database proxy 500 may implement cache management 530. Cache management 530 may manage results cache 510, determining when to maintain, invalidate, evict or otherwise modify the contents of results cache 510. For instance, in some embodiments, cache management 530 may track the types of requests that pass through the database proxy, as discussed below with regard to FIG. 10, in order to refresh results cache 510 with valid versions of results, in some embodiments. In at least some embodiments, cache management 530 of one database proxy may update the results cache 510 of another database proxy. Cache management 530 may also determine when to invalidate cache entries. For example cache management 530 may maintain and update mapping information, an index, listing, or other metadata describing the contents of results cache 510. When data is updated via a request received from a database client, in addition to sending the update request to be performed at the database, affected results in results cache 510 may be marked as invalid or unavailable for servicing access requests.

In at least some embodiments, database proxy 500 may implement access control 540. Access control 540 may manage, create, remove, or otherwise modify one or multiple access control policies for a database. For instance, an access control policy may only allow authorized users to update certain portions of data in a database, while other users may be limited to the ability to access the database for reading data. Access control policies may be implemented in many different ways, such as preventing or allowing requests from certain sources, preventing or allowing requests based on the type or request and/or preventing or allowing requests based on the data involved in the request. Failure to satisfy an access control policy may result in the denial of the request sent to the database client. Access control policies may be implemented to provide security and/or performance controls for databases. For instance, an access control policy may block certain types of database queries which involve locking an entire database table and preventing other database requests from accessing the database table. In this way, the access control policy may improve the performance of access to the database by preventing access requests from being blocked due to one other request.

In at least some embodiments, database proxy 500 may implement compression engine 550. Compression engine 550 may be implemented to compress or decompress data moving between database proxies via a proxy tunnel. For instance, in some embodiments, multiple different loss-less compression techniques may be applied to data retrieved for a query request (e.g., run-length encoding, then bzip encoding). The compression may be performed at server-side database proxy and sent in compressed form from the server-side database proxy to a client-side database proxy. The client-side database proxy may then decompress the data and store the data in results cache 510 and/or send the data to a database client. In this way, network bandwidth between a database client and database may be conserved as the space consumed by compressed data may be less than when uncompressed.

In at least some embodiments, database proxy 500 may implement encryption engine 560. Encryption engine 560 may be implemented to encrypt or decrypt data moving between database proxies via a proxy tunnel. For instance, in some embodiments, encryption engine 550 may employ encryption techniques to be applied to data retrieved for a query request (e.g., symmetric key encryption or public key encryption). The encryption may be performed at a server-side database proxy and sent in encrypted form from the server-side database proxy to a client-side database proxy. The client-side database proxy may then decrypt the data and store the data in results cache 510 and/or send the data to a database client. In this way, data security may be obtained for data moving between two different networks via a public network (e.g., the Internet) without modifying the database client or database to provide the increased data security.

Although the components illustrated in FIG. 5 provide examples of some of the different functionalities that may be performed by a database proxy, different combinations of functionality may be implemented depending on proxy tunnel configuration. For instance, when client-side and server-side database proxies are implemented, server-side database proxies may not actually maintain a results cache. Similarly, for single database proxy implementations, such as illustrated in FIGS. 2 and 3 above, compression engine 550 and encryption engine 560 may not be implemented. Therefore, the previous discussion is not intended to be limiting to the various components and/or functionalities of a database proxy, in some embodiments.

Figure 6:
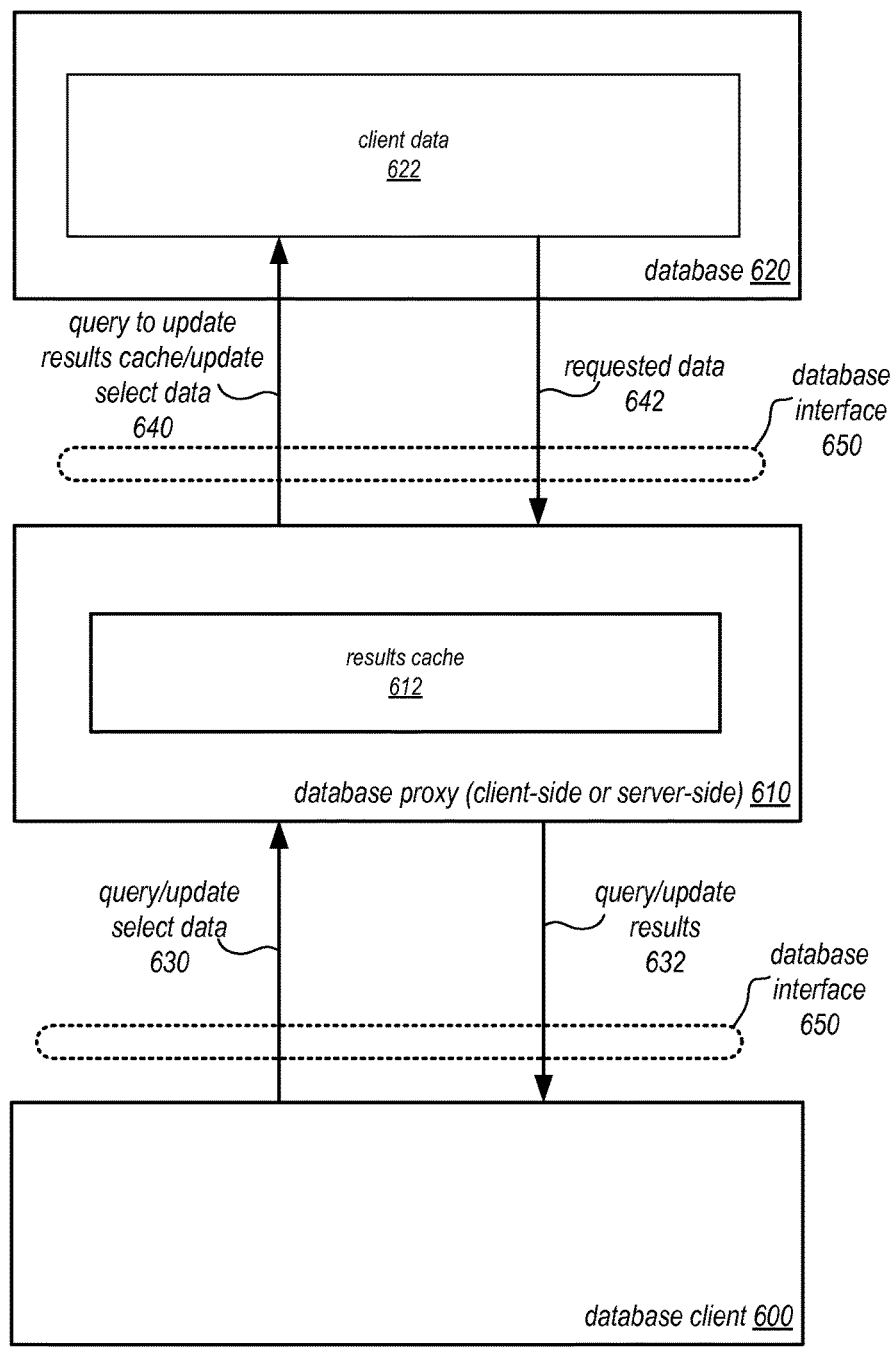
FIG. 6 illustrates interactions among a single database proxy, database clients, and a database in order to provide transparent proxy tunnel caching, according to some embodiments.

FIG. 6 illustrates interactions among a single database proxy, database clients, and a database in order to provide transparent proxy tunnel caching, according to some embodiments. Database client 600 may be a database client like database clients 200, 300, and 400 discussed above with regard to FIGS. 2-4, configure to send database requests to database 620. Database 620 may be any type of database, such as discussed above with regard to databases 220, 320, and 420 in FIGS. 2-4. In at least some embodiments, database 620 may a network-based service, such as a service offered by a provider network. Database interface 650 may be a programmatic interface according to which database requests may be formatted.

A proxy tunnel may in some embodiments be implemented with a single database proxy, such as database proxy 610. As discussed above with regard to FIGS. 2 and 3, a single database proxy may be implemented client-side or server-side. When request, such as a query request or request to update select data 630 is received at database proxy 610, an evaluation of the request may be performed. If the request is a query request, then it may be determined whether results cache 612 maintains a valid version of the requested data in the query request. If so, database proxy 610 obtains the data from results cache 612 sends back the data as query results 632 to database client 600. In this way, database proxy 610 services query requests from database client 610 without consuming database 620 resources to service the request and without any perceptive change from the database client's 600 perspective.

For queries 630 where the data is not stored in results cache 612, or updates 630 to select data, database proxy may forward or send the database queries on to database 620 for processing. In the update scenario, database proxy 610 may invalidate entries in results cache 612 if the data to be updated is stored in results cache 612. Database proxy 610 may send on the database request formatted according to interface 650 so that the update to the respective portion of client data 622 may be performed. In some embodiments, acknowledgments of the update may be received back (not illustrated) from database 620, and corresponding acknowledgments provided as results 632 to database client 600. Similarly, in the scenario where results cache 612 does not store data requested in a query 630, the query may be forwarded or otherwise sent to database 620 in order to receive select data 642 back from database 620. Database proxy may update results cache 612 to store the data for subsequent query requests and send query results 632 to database client 600.

Figure 7:
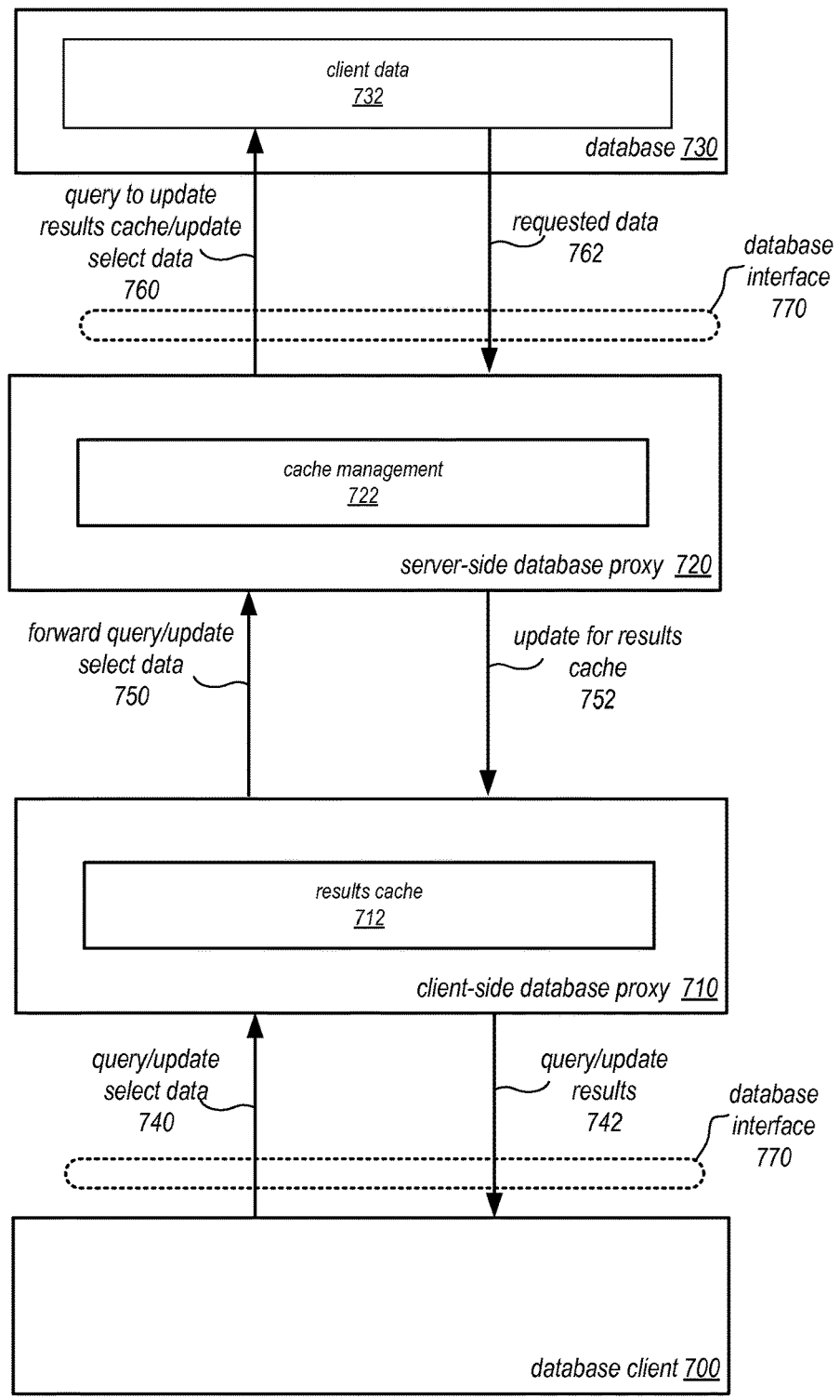
FIG. 7 illustrates interactions among multiple database proxies, database clients, and a database in order to provide transparent proxy tunnel caching, according to some embodiments.

FIG. 7 illustrates interactions among multiple database proxies, database clients, and a database in order to provide proxy tunnel caching, according to some embodiments. As with FIG discussed above, database client 700 may be a database client like database clients 200, 300, and 400 discussed above with regard to FIGS. 2-4, configure to send database requests to database 730. Database 730 may be any type of database, such as discussed above with regard to databases 220, 320, and 420 in FIGS. 2-4. In at least some embodiments, database 730 may a network-based service, such as a service offered by a provider network. Database interface 770 may be a programmatic interface according to which database requests may be formatted. Note that in various embodiments, the calls and responses between database client 700 and client-side database proxy 710 (e.g., communications 740 and 742) and/or the calls and responses between server-side database proxy 720 and database 730 (e.g., communications 760 and 762) in FIG. 5 may be performed over a secure proxy connection (e.g., one managed by a gateway control plane), or may be performed over the public network or, alternatively, over a private channel such as a virtual private network (VPN) connection.

A proxy tunnel may in some embodiments be implemented with multiple database proxies, such as client-side database proxy 710 and server-side database proxy 720.

When a request, such as a query request or request to update select data 740 is received at client-side database proxy 710, an evaluation of the request may be performed. If the request is a query request, then it may be determined whether results cache 712 maintains a valid version of the requested data in the query request. If so, client-side database proxy 710 obtains the data from results cache 712 sends back the data as query results 742 to database client 700.

For queries 740 where the data is not stored in results cache 712, or updates 740 to select data, client-side database proxy 710 may forward 750 or send the database queries on to server-side database proxy 720 for processing. Server-side database proxy 720 may track, monitor, or otherwise maintain information concerning query and update requests received from client-side database proxy 710 as part of cache management. In this way, server-side database proxy may, for instance, update or refresh portions of results cache 712 at client-side database proxy 710 by periodically sending updates for results cache 752. If, for instance, multiple different database clients are writing to multiple different client-side database proxies, then it may be that a client-side database proxy 710 stores invalid or inconsistent data in results cache 712 unawares. Updates for results cache 752 provided to client-side database proxy 710 dynamically may ensure consistent or current understandings of client data 732 in database 730. For instance, cache management 722 may detect update events for cached results, as discussed below with regard to FIG. 10. In some embodiments, server-side database proxy 720 may send queries 760 to database 730 to obtain those portions of client data 732 that are provided in updates for results cache. In some instances, such as the scenario where a query request received at client-side database proxy 710 triggers the discovery of an invalid or missing entry stored in results cache 712, server-side database proxy may send on 760 the query request forwarded 750 to database 730. Similarly, update requests 740 received at server-side database proxy 710 may sent on 760 to be performed at database 730.

The interactions described above with regard to FIGS. 6 and 7 are not intended to be limiting as to various other interactions between database proxies, database clients, and databases. For instance, multiple servers, nodes, systems or devices may implement database proxies. Communications between the different proxy servers may be performed. For example, gossip protocols, publish protocols, and other information sharing may be performed so that updates to results cache 612 may be consistent across the multiple proxy servers. Similarly, some proxy servers may be responsible for handling requests for certain data, therefore, some database proxies may forward a database client request to another database proxy for processing.

Additionally, these interactions between database clients, database proxies, and databases as described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The interfaces described herein may in some embodiments be wrapped with client libraries in various languages, including, but not limited to, C, C++, Java, C# and Perl to support integration with databases, such as databases 620 and 730.

Figure 8:
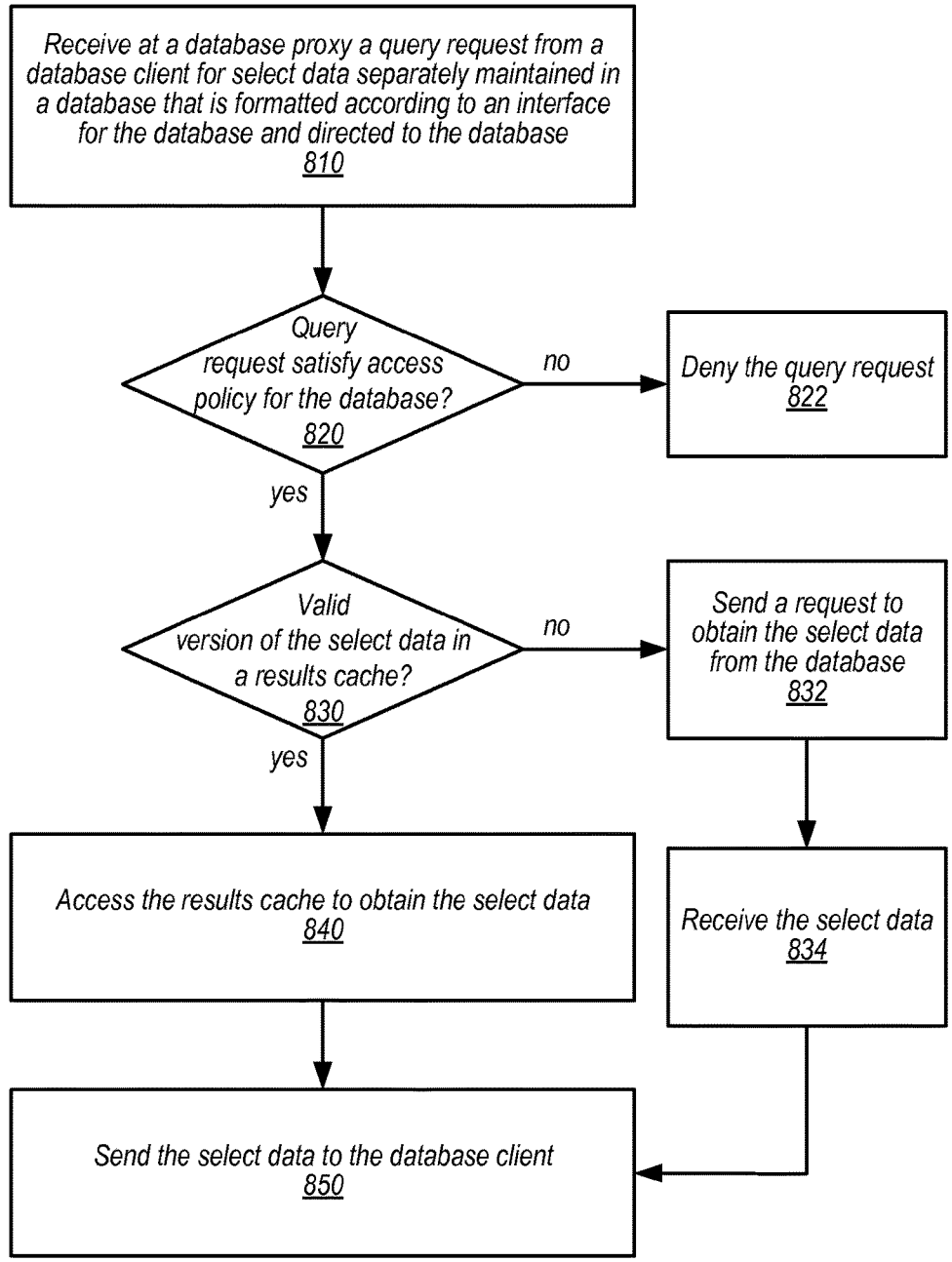
FIG. 8 is a high-level flowchart illustrating various methods and techniques for processing query requests in accordance with transparent proxy tunnel caching for database access, according to some embodiments.

FIGS. 2-7 discussed above provide various examples of a databases and database clients for which transparent proxy tunnel caching may be implemented for database access. FIG. 8 is a high-level flowchart illustrating various methods and techniques for processing query requests in accordance with proxy tunnel caching for database access, according to some embodiments. Many of the examples below may be performed using various embodiments of the database prox(ies) described above with respect to FIGS. 2-7. However, other configurations of databases, database clients, and/or database proxies thereof may be implemented. Moreover, any other system, such as one of the various components of computer system 2000 described below with regard to FIG. 11, may also implement the techniques described herein to implement proxy tunnel caching for database access, and as such, the following discussion is not to be construed as limiting to any one of the multiple examples given.

As indicated at 810, a query request from a database client for select data separately maintained in a database may be received. Databases may be separate from database prox(ies) implementing a proxy tunnel between database clients and databases, as discussed above with regard to FIGS. 2-4. For instance, a database proxy may be implemented at a different server in a network that also implements one or more database servers. In some embodiments, the database may be implemented by a database service offering the database as part of a provider network. Another service in the provider network may be utilized to implement a database proxy, in some embodiments (e.g., a computing service that provides virtual compute instances that run different applications, such as an application that implements a database proxy, or a load balancing or request handling service).

Query requests may be formatted according to an interface for the database, in various embodiments. For instance, if the database implements a particular programmatic interface for performing updates, then query requests may be formatted in accordance with the particular programmatic interface. Standard programmatic interfaces (i.e. Application Programming Interfaces (APIs)) may be implemented, such as JDBC or ODBC. Alternatively, custom interfaces specific to the database may be implemented and query requests may be formatted accordingly. Query requests may include requests to get, select, determine, or otherwise obtain data from a database (e.g., SQL statements such as "SELECT" and "WHERE", REST statements "GET", custom interface keywords or statements, etc.). In at least some embodiments query requests may be formatted in such as way so that interaction with a database proxy appears to be an interaction with the database (from the perspective of the database client). For instance, query requests in various embodiments may be directed to the database. For instance, when configuring a database client the location or identity of the database may be substituted with the location or identity (e.g., network address) of a database proxy. Thus, a database client may send requests to a database proxy as if it were the database to which the requests are ultimately directed. In this way, results caching, encryption, compression, and other techniques discussed below may be performed without action, management, or even knowledge on the part of the database client or database.

In at least some embodiments, access controls may be implemented for requests sent from database clients to the database via the proxy tunnel. For instance, as indicated at 820, the query request may be evaluated with respect to access control polic(ies). If the query request does not satisfy an access control policy, then the query request may be denied, as indicated at 822. Access control policies may describe how to determine which requests may be performed for a variety of different purposes, such as performance or security. For instance, access control policies may prevent or allow requests from certain sources, such as certain users, database applications, network addresses, or other indications of identity in order to secure data from wider exposure. Access control policies may prevent or allow requests based on the type or request (e.g., query, update, etc.) and/or the data involved in the query (e.g., private data may not be read, account data may not be written to by particular users, etc.), for instance to improve the performance of the database by only permitting certain types of queries or certain amounts of data to be accessed at a time. Access control policies implemented as part of the proxy tunnel between a database application and database may allow for third-party managed access controls to be implemented without modifying the database client or database, in various embodiments.

A determination may be made as to whether a valid version of the select data is stored in the results cache, as indicated at 830, in various embodiments. A valid version of data may be a version of the data which is provided or used to service access requests received at a database proxy. For example, mapping information, an index, a listing, or other metadata may be maintained which indicates the data stored in the results cache. Stored query results, for instance, may be maintained along with storage locations in the results cache. The query request may be evaluated comparing the query request to the mapping information to determine whether the select data is present in results cache. Markers, flags, or other indicators may also be maintained for data stored in the results cache indicating whether or not the data is valid for servicing query requests. If the select data is not a valid version, for instance, then the select data in the results cache may be obsolete or inconsistent with the select data stored in the database.

As indicated by the negative exit from 830, a request may be sent to obtain the select data from the database, as indicated at 832, in some embodiments. Depending on the configuration of the proxy tunnel (e.g., as discussed earlier with regard to FIGS. 2-4), the query request may be sent directly to the database to be performed, or may be sent along to another database proxy node to perform the query request (e.g., send the query request from a client-side database proxy to a server-side database proxy, which in turn sends the request to the database to perform). The select data may be received, as indicated at 834. In at least some embodiments, the configuration of the proxy tunnel may allow for encryption and/or compression to be applied to data transferred via the proxy tunnel to and from the database. For instance, a server-side database proxy may compress the select data obtained from the database according to one or more compression techniques prior to sending the select data to a client-side database proxy. Likewise, the server-side database proxy may encrypt the select data obtained from the database according to one or more encryption techniques prior to sending the select data to the client-side database proxy. Many different compression and encryption techniques may be performed as discussed above. Thus, before sending the select data to the database client, as indicated at 850, in at least some embodiments, the select data received, as indicated at 834, may be decompressed and/or decrypted according to the same compression and/or encryption technique(s).

As indicated by the positive exit from 830, the results cache may be accessed to obtain the select data, as indicated at 840, when a valid version of the select data is stored in the results cache. Different schemes for implementing the cache, such as those discussed above with regard to FIG. 5, may determine how the results cache is accessed. If, for instance, data is distributed amongst multiple result cache locations (e.g., on different servers or nodes), then a scheme for identifying the appropriate server to access may be implemented (e.g., a hashing scheme that indicates which results cache data is resident on which node). However obtained, the select data may then be sent in a response to the database client, as indicated at 850. The response to the client may be formatted according to the database interface so that from the database client's perspective, the database appears to have responded to the query request.

Please note that techniques described above were discussed in the context of providing access to a single database. However, in at least some embodiments, tunnel proxy caching may be provided for the same or different data maintained in multiple different databases for the same or different database clients.

Figure 9:
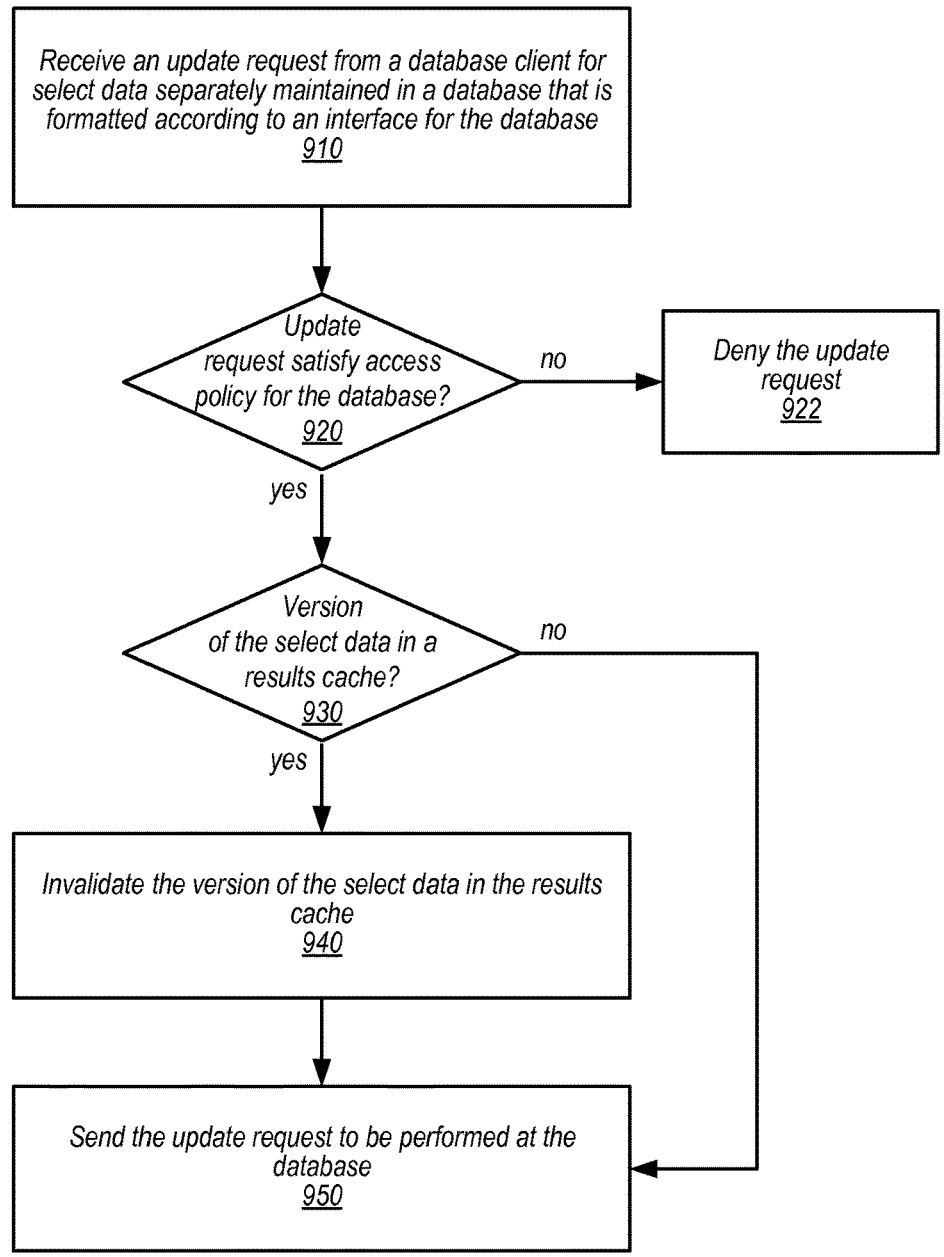
FIG. 9 is a high-level flowchart illustrating various methods and techniques for processing update requests in accordance with transparent proxy tunnel caching for database access, according to some embodiments.

Caching results of database queries based on proxy tunneling may improve database client performance and database resource utilization efficiency. The effects updates or changes to data in the database (e.g., by multiple different writers) may be accounted for when processing update requests at database prox(ies). FIG. 9 is a high-level flowchart illustrating various methods and techniques for processing update requests in accordance with proxy tunnel caching for database access, according to some embodiments. As indicated at 910, an update request may be received from a database client for select data separately maintained in a database. As with the query requests, discussed above with regard to FIG. 8, update requests may be formatted according to an interface for the database. For instance, if the database implements a particular programmatic interface for performing updates, then update requests may be formatted in accordance with the particular programmatic interface. Update requests may include requests to change, modify, delete, move, or remove data from a database (e.g., SQL statements such as "INSERT", "UPDATE", or "DELETE", REST statements "PUT" or "DELETE", custom interface keywords or statements, etc.). In at least some embodiments, update requests, as with query requests, may be formatted in such as way so that interaction with a database proxy appears to be an interaction with the database (from the perspective of the database client).

Access controls may be implemented for update requests, in at least some embodiments. Similar to the discussion above with regard to element 820 in FIG. 8, if the update request does not satisfy an access policy for the database, as indicated by the negative exit from 920, then the update request may be denied. For example, certain application clients may have limited access to the database (e.g., read only, write access limited to particular entries, etc.). The access policies, as noted earlier, may be defined in several ways, based on application client identity, request type, and/or the data identified as involved with the update. User accounts, source identifiers, and/or other information may be included in update requests that may be used to determine whether an update request satisfies one or more multiple access policies for the database. Query predicates, keys, or other identifiers included in the update requests may identify the data to be updated. Similarly the update request itself may identify the type of update request (e.g., delete a value, change a value, etc.).

In some embodiments, a determination may be made as to whether a version of the select data is stored in a results cache, as indicated at 930. For example, an index, mapping information, listing, or other set of metadata may describe the stored results in a results cache. The data to be updated may be compared to this mapping information in order to determine if the update requests affects stored results. If a version of the select data is stored in the results cache, as indicated by the positive exit from 930, then the version of the select data in the results cache may be invalidated, as indicated at 940. For instance, a marker, identifier, or other indication may be stored in mapping information for the results cache or in the results cache itself to indicate that the select data is no longer valid for servicing query requests. In some embodiments, invalidation may involve removing the select data from the results cache.

Once the version of the select data is invalidated, then as indicated at 950, the update request may be sent to be performed at the database. Alternatively, as indicated by the negative exit from 930, the update request may be sent to be performed at the database without affect the results cache, in some scenarios. As noted above, depending on the configuration of the proxy tunnel (e.g., as discussed earlier with regard to FIGS. 2-4), the update request may be sent directly to the database to be performed, or may be sent along to another database proxy node to perform the update request (e.g., send the update request from a client-side database proxy to a server-side database proxy, which in turn sends the request to the database to perform). Please note that FIG. 9 is provided as an example of some techniques for handling updates to a database with proxy tunnel caching, and is not intended to be limiting. Other techniques may be performed to process updates to a database with proxy tunnel caching. For instance, the data updated in response to an update request may be stored in the results cache for handling subsequent query requests.

Figure 10:
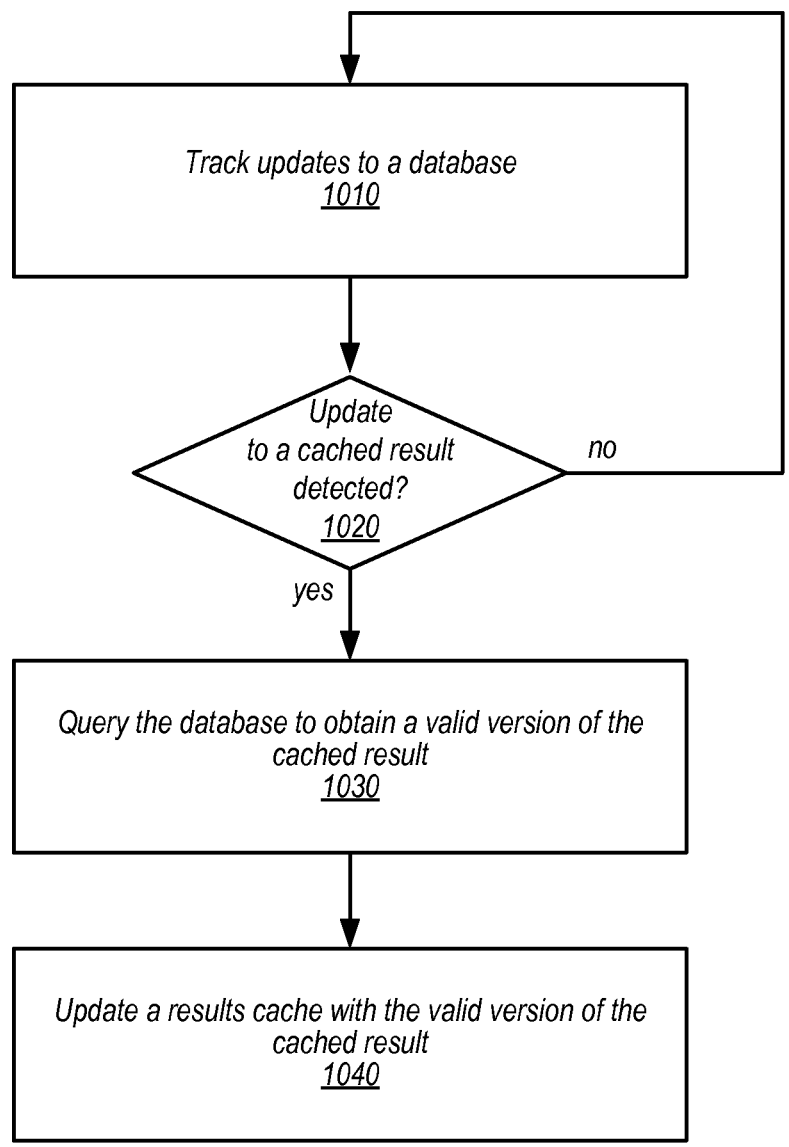
FIG. 10 is a high-level flowchart illustrating various methods and techniques for updating stored results in a results cache, according to some embodiments.

Caching results of queries at database proxies allows for the introduction of numerous other functionalities not common to database systems or database clients without significant adaptation. For instance, encryption, compression, and access controls, as discussed above with regard to FIG. 8, may be implemented when transporting data between database proxies, without requiring modifications to a database or database client. Similar functionalities may be implemented with respect to cache functionality and/or management. For instance, instead of waiting until the results cache is "warm" (i.e., maintaining commonly queried data) at a client-side database proxy, a server-side database proxy can provide commonly queried data to a client-side database proxy when the client-side proxy starts up. Another example scenario may include multiple writers to a database which may change data stored as part of a results cache. Instead of waiting to query the database for the new data when a query is received, the data in the results cache may be dynamically or proactively updated to reflect new data. FIG. 10 is a high-level flowchart illustrating various methods and techniques for updating stored results in a results cache, according to some embodiments.

As indicated at 1010, updates to a database may be tracked, in various embodiments. For example, a server-side database proxy (or group of server-side database proxies) may handle all incoming requests to a database from client-side database prox(ies). When update requests are received at the server-side database prox(ies), the server-side database proxies may record changes made to the data or record which entries in the database have been changed. A log, index, listing, or other data structure may be implemented, for instance, to identify updated database entries and/or record new values for updated database entries. As indicated at 1020, an update to a cached result stored in a results cache may be detected, in some embodiments. For instance, as noted above, the server-side database prox(ies) may handle incoming requests, including query requests. Similar to update requests, the server-side database prox(ies) may maintain information tracking or indicating the content of results cache(s) at client-side database prox(ies) (e.g., recording the content or the entries data sent in response to query requests received from client-side prox(ies)). When an update request is received, the affected data may be identified and compared with the information indicating the contents of the results cache(s). If an update changes a value that is indicated in the results cache(s), then an update to a cached result may be detected.

In some embodiments, a query may be sent to the database to obtain a valid version of the cached result for which the updated is detected, as indicated at 1030. Database entries identified by query predicates, keys, or other identifiers may be accessed via a database query request sent to the database to retrieve the version of the database entries currently stored in the database, for example. However, in some embodiments, as noted above, a database proxy, such as the server-side database prox(ies) discussed above, may maintain the content or value of updated cached results. Thus, the database may not be queried in some cases.

The valid version of the cached results may be then be used to update a results cache with the valid version of the cached result, as indicated at 1040. The valid version of the cached result, for instance, may be sent to a client-side database proxy to be stored in the results cache, in some embodiments. In other embodiments, the results cache may be local to the database node tracking updates (e.g., at a server-side database proxy or client-side database proxy implementing the techniques discussed with regard to FIG. 10), and thus the results cache may be locally updated.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 11:
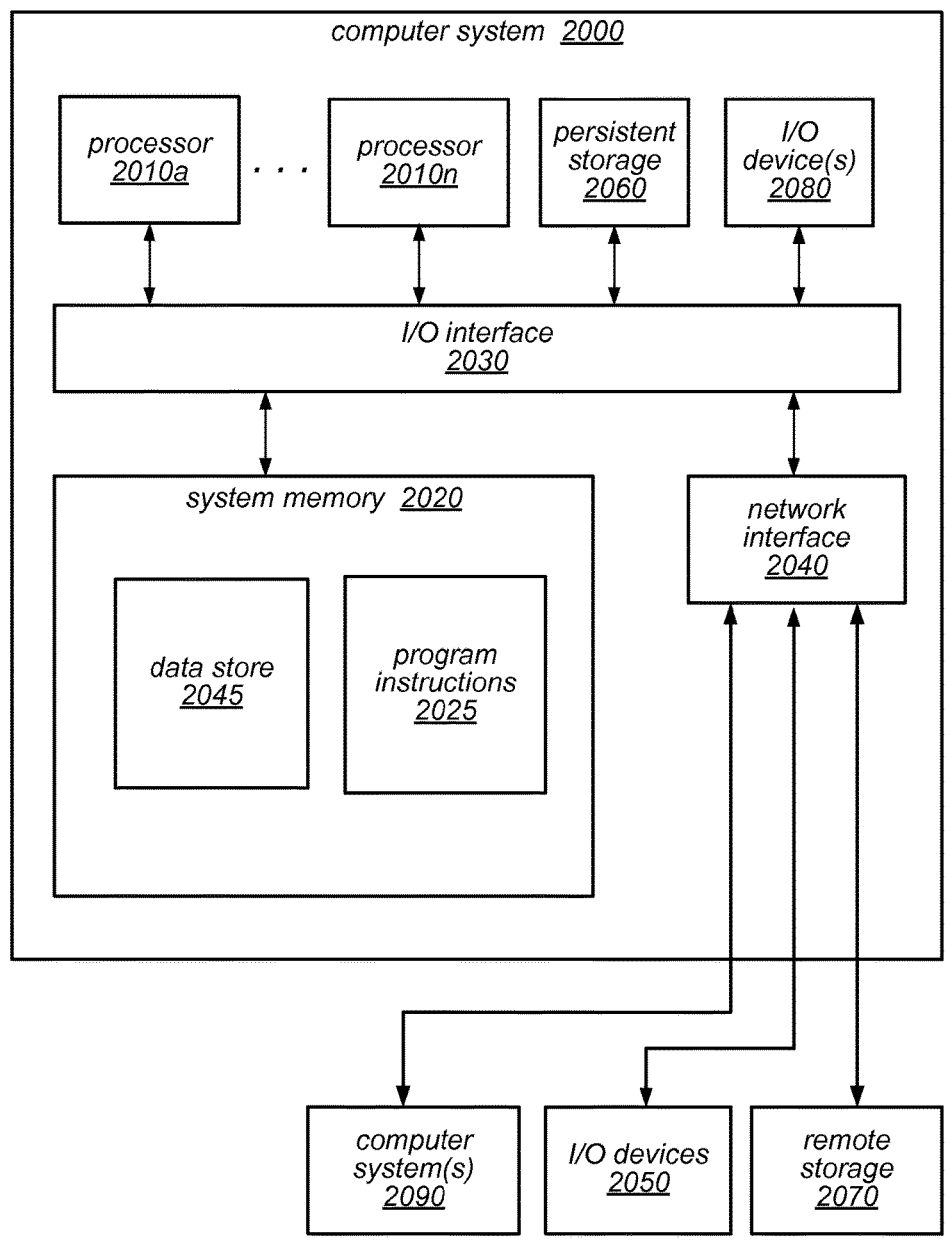
FIG. 11 illustrates an example computing system, according to some embodiments.

FIG. 11 is a block diagram illustrating a computer system configured to implement at least a portion of the database proxies, clients, storage or other database systems described herein, according to various embodiments. For example, computer system 2000 may be configured to implement a database, or portions of a distributed database, that stores data and on behalf of database clients, in different embodiments. In another example, computer system 2000 may be configured to implement a database client which accesses a database via a proxy tunnel that provides transparent proxy caching. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database proxy, such as a client-side or server-side database proxy. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the results cache (e.g., on a database proxy), may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database may present database services and/or other types of data storage services that employ the proxy tunnel described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more computing devices implementing a database having an interface to accept query and update requests to the database according to a format;
one or more computing devices implementing a server-side database proxy that accesses the database via the interface, the server-side proxy being separately maintained from the database;
one or more computing devices implementing a client-side database proxy, configured to:
receive, from a database client, a query request for select data of the database that is directed to the database, wherein the query request is formatted according to the interface for the database;
evaluate the query request to determine that a valid version of the select data is stored as part of a results cache that stores data received from the server-side database proxy for previously performed queries to the database;
in response to the determination that the valid version of the select data is stored as part of the results cache:
access the results cache to obtain the select data; and
send the select data to the database client; and
in response to receiving an update request from the database client for at least a portion of the select data, invalidate the portion of the select data in the results cache;
wherein the client-side database proxy comprises a proxy interface that replicates the interface of the database, and the query request and update request are received via the proxy interface.

2. The system of claim 1, wherein the client-side database proxy is further configured to:
receive, from the database client, another query request for other select data separately maintained in the database;
evaluate the other query request to determine that a valid version of the other select data is not stored as part of the results cache;

in response to the determination that the valid version of the other select data is not stored as part of the results cache, send a request to the server-side database proxy to obtain other select data from the database; and in response to receiving the other select data from the server-side database proxy, send the other select data to the database client.

3. The system of claim 2,
wherein the server-side database proxy is configured to:
prior to sending the other select data to the client-side database proxy, perform at least one of the following:
compress the other select data according to one or more compression techniques; or
encrypt the other select data according to one or more encryption techniques;
wherein the client-side database proxy is configured to:
prior to sending the other select data to the database client, perform at least one of the following:
decompress the other select data according to the one or more compression techniques; or
decrypt the other select data according to the one or more encryption techniques.

4. The system of claim 1,
wherein the server-side database proxy is configured to:
detect an update to the select data that results in a new version of the select data; and
send the new version of the select data to the client-side database proxy to update the select data stored in the results cache;
wherein the client-side database proxy is configured to:
receive the new version of the select data; and
store the new version of the select data in the results cache for subsequent access.

5. A method, comprising:
performing, by one or more computing devices:
receiving, at a transparent database proxy, a query request from a database client for select data separately maintained as part of a database, wherein the query request is formatted according to a proxy interface, and the proxy interface replicates an interface of the database that accepts query and update requests for the database and directed to the database;
evaluating, at the database proxy, the query request to determine that a valid version of the select data is stored as part of a results cache storing data obtained from previously performed queries to the database;
in response to determining that the valid version of the select data is stored as part of the results cache:
accessing, by the database proxy, the results cache to obtain the select data; and
sending, from the database proxy, the select data to the database client; and
in response to receiving an update request for at least a portion of the select data via the proxy interface, invalidate the portion of the select data in the results cache.

6. The method of claim 5, further comprising:
receiving, at the database proxy from the database client, another query request for other select data separately maintained in the database;
evaluating, at the database proxy, the other query request to determine that a valid version of the other select data is not stored as part of the results cache;
in response to determining that the valid version of the other select data is not stored as part of the results cache, sending, from the database proxy, a request to obtain the other select data from the database; and in response to receiving the other select data at the database proxy, sending, from the database proxy, the other select data to the database client.

7. The method of claim 6, wherein the database proxy is a client-side database proxy, wherein the request to obtain the other select data is sent to a server-side database proxy, and wherein the method further comprises:
sending, by the server-side database proxy, the query request to the database to obtain the other select data; and
in response to receiving the other select data from the database at the server-side database proxy, sending, by the server-side database proxy, the other select data to the client-side database proxy in order to update the results cache with the valid version of the other select data.

8. The method of claim 7, further comprising:
prior to sending the other select data to the client-side database proxy, compressing, by the server-side database proxy, the other select data according to one or more compression techniques; and
prior to sending the other select data to the database client, decompressing, by the client-side database proxy, the other select data according to the one or more compression techniques.

9. The method of claim 7, wherein the client-side proxy is implemented as part of a same network as the database client, wherein the server-side proxy is implemented as part of same other network as the database, wherein communication between the network and the other network is transported via a public network, and wherein the method further comprises:
prior to sending the other select data to the client-side database proxy, encrypting, by the server-side database proxy, the other select data according to one or more encryption techniques; and
prior to sending the other select data to the database client, decrypting, by the client-side database proxy, the other select data according to the one or more encryption techniques.

10. The method of claim 5, wherein the database proxy is a client-side database proxy, wherein the data obtained from the previously performed queries to the database is received at the client-side database proxy from a server-side database proxy, and wherein the method further comprises:
detecting, at the server-side database proxy, an update to the select data that results in a new version of the select data; and
sending, by the server-side database proxy, the new version of the select data to update the select data stored in the results cache.

11. The method of claim 5, wherein the database proxy is a client-side database proxy, wherein the client-side proxy is implemented as part of a same network as the database client, wherein the database is implemented as part of another network, and wherein the method further comprises:
receiving, at the client-side database proxy from another database client implemented as part of the same network as the database client and the client-side database proxy, another query request for the select data that is directed to the database;
evaluating, at the client-side database proxy, the query request to determine that the valid version of the select data is stored as part of the results cache;

in response to determining that the valid version of the select data is stored as part of the results cache:
accessing, by the client-side database proxy, the results cache to obtain the select data; and
sending, from the client-side database proxy, the select data to the other database client.

12. The method of claim 5, further comprising:
obtaining a valid version of the portion of the select data from the database; and
updating the results cache with the valid version the portion of select data.

13. The method of claim 5, further comprising:
receiving, at the database proxy from the database client, a query request for other select data separately maintained as part of a different database than the database, wherein the query request is formatted according to another proxy interface that replicates another interface for the different database that accepts query requests for the different database, wherein the query request for the other select data is directed to the different database;
evaluating, at the database proxy, the query request to determine that a valid version of the other select data is stored as part of the results cache storing data obtained from previously performed queries to the different database;
in response to determining that the valid version of the other select data is stored as part of the results cache:
accessing, by the database proxy, the results cache to obtain the other select data; and
sending, from the database proxy, the other select data to the database client.

14. A non-transitory, computer-readable storage medium, storing program instructions that when executed by one or more computing devices cause the one or more computing devices to implement:
receiving, at a transparent database proxy, a query request from a database client for select data separately maintained as part of a database, wherein the query request is formatted according to a proxy interface, and the proxy interface replicates an interface of the database that accepts query and update requests for the database, wherein the query request is directed to the database;
evaluating, at the database proxy, the query request to determine that a valid version of the select data is stored as part of a results cache storing data obtained from previously performed queries to the database;
in response to determining that the valid version of the select data is stored as part of the results cache:
accessing, by the database proxy, the results cache to obtain the select data; and
sending, from the database proxy, the select data to the database client; and
in response to receiving an update request for at least a portion of the select data via the proxy interface, invalidate the portion of the select data in the results cache.

15. The non-transitory, computer-readable storage medium of claim 14, wherein the program instructions cause the one or more computing devices to further implement:
receiving, at the database proxy from the database client, another query request for other select data separately maintained in the database;
evaluating, at the database proxy, the other query request to determine that a valid version of the other select data is not stored as part of the results cache;
in response to determining that the valid version of the other select data is not stored as part of the results cache, sending, from the database proxy, a request to obtain the other select data from the database; and
in response to receiving the other select data at the database proxy, sending, from the database proxy, the other select data to the database client.

16. The non-transitory, computer-readable storage medium of claim 15, wherein the database proxy is a client-side database proxy, wherein the request to obtain the other select data is sent to a server-side database proxy, and wherein the method further comprises:
sending, by the server-side database proxy, the query request to the database to obtain the other select data; and
in response to receiving the other select data from the database at the server-side database proxy, sending, by the server-side database proxy, the other select data to the client-side database proxy in order to update the results cache with the valid version of the other select data.

17. The non-transitory, computer-readable storage medium of claim 14, wherein the database proxy is a client-side database proxy, wherein the data obtained from the previously performed queries to the database is received at the client-side database proxy from a server-side database proxy, and wherein the program instructions cause the one or more computing devices to further implement:
detecting, at the server-side database proxy, an update to the select data that results in a new version of the select data; and
sending, by the server-side database proxy, the new version of the select data to update the select data stored in the results cache.

18. The non-transitory, computer-readable storage medium of claim 14, wherein the database proxy is a server-side database proxy.

19. The non-transitory, computer-readable storage medium of claim 14, wherein the program instructions cause the one or more computing devices to further implement:
receiving, at the database proxy from the database client, another query request for other select data separately maintained in the database;
evaluating, at the database proxy, the query request to determine that the other query request does not satisfy an access control policy for the database; and
in response to determining that the other query request does not satisfy the access control policy, denying, at the database proxy, the other query request.

20. The non-transitory, computer-readable storage medium of claim 14, wherein the database is a network-based database service implemented as part of a provider network, wherein the database proxy is a client-side database proxy, wherein the client-side database proxy and the database client are implemented as part of a network different than the provider network.

* * * * *